Dec. 15, 1953  A. L. STONE  2,662,277
METHOD OF MAKING FUSED JOINTS
Filed Dec. 10, 1946
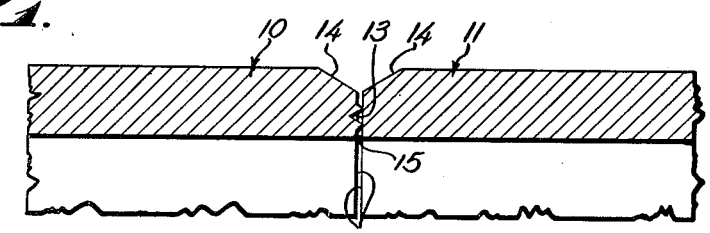
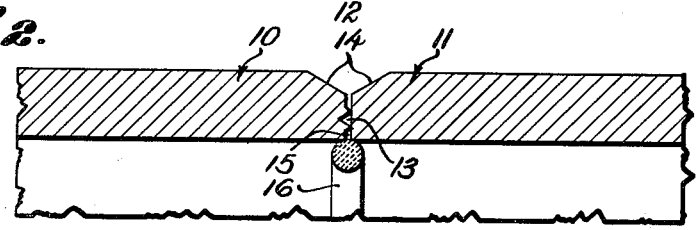
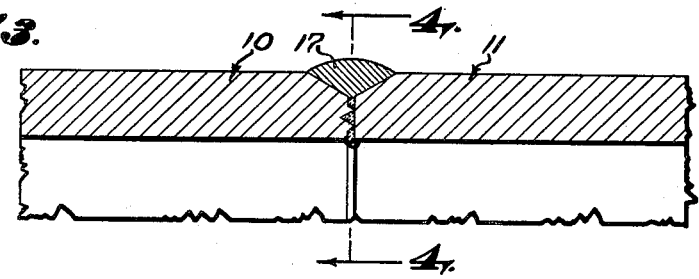
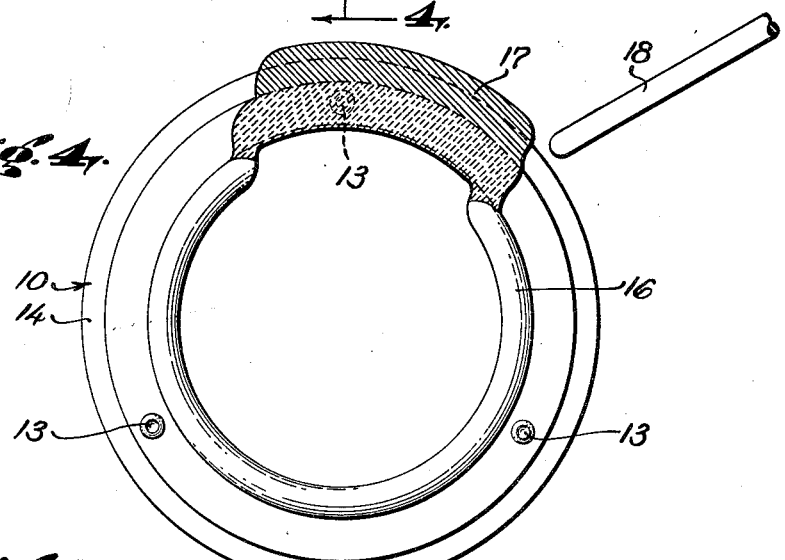
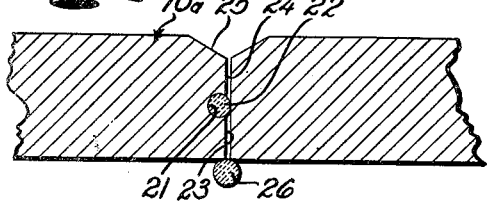
ALBERT L. STONE
INVENTOR.
BY
ATTORNEY Patented Dec. 15, 1953

2,662,277

UNITED STATES PATENT OFFICE 2,662,277

METHOD OF MAKING FUSED JOINTS

Albert L. Stone, Palos Verdes Estates, Calif.

Application December 10, 1946, Serial No. 715,169

4 Claims. (Cl. 29—371)

This invention has generally to do with the formation of fused joints between metal sections, and particularly contemplates improved methods for joining tubular parts such as oil well pipe or tool joint sections. Specifically the invention is directed to the formation of butt type joints by metal bondage between opposed end faces of the sections.

Various expedients have been used in the past to butt weld such sections, and with the object of forming a strong joint resistant to failure under working stresses. Typical are the known pressure and flash welding methods, both of which require expensive equipment for their operation. Pressure welding requires extreme accuracy, to the degree of polish finishes, in the conformance of the end faces of the joint sections, so that oxygen may be excluded during heating. But even with that preparation, it is not possible to predetermine, or later ascertain a satisfactory condition of the joint. Flash welding need not require such perfect formation of the section faces, but it has the disadvantage of high equipment costs. Since according to both of these methods the heavy section is heated to forging temperature and upset by the application of great end pressure, the problem of assuring and ultimately maintaining accurate alinement of the sections presents serious difficulties and costly corrective measures.

Attempts have been made to butt braze the sections, with the objective of obviating the limitations and cost considerations of the conventional methods. Such efforts have had little success however, for a reason which may not have been understood, but which has become evident during the course of my investigations. Upon careful observation, I have found that heat applied to the adjacent end portions of the sections in attempting to braze them together, so expands the metal that the sections take a bell-like outward divergence at their end faces, which correspondingly opens space between those faces. Then, upon cooling, the sections break away from the braze metal and the intended joint fails.

The invention affords a solution to the problem of overcoming this belling effect and assuring a full strength braze joint. Generally speaking, the invention is predicated upon the concept of employing a weld or relatively high fusion temperature metal bond between the sections to secure them against divergence or belling, and melting a brazing or relatively low fusion temperature metal against their end faces while the sections are so secured, all by a simple and direct method which does not require the expensive equipment necessitated by other methods.

In accordance with the invention, I secure the joint sections at the outside of their end faces by welding, and then allow the braze metal melted against said faces at the inside of the weld to solidify while the sections are held together by the weld. As will appear, the welding and brazing operations may occur together, as by depositing the weld while using the welding heat to fuse and flow the inwardly placed brazing metal against the section end faces, the welding metal solidifying in advance of the brazing metal to strongly bond the sections together; or the sections may be welded together at the outside and thereafter heated at the weld to fuse the brazing metal, but at a temperature below the fusing point of the weld.

The various features and objects of the invention, as well as the details of illustrative procedures and embodiments, will be understood to better advantage from the following description of the accompanying drawing, in which:

Figs. 1, 2 and 3 are fragmentary sectional views showing the end portions of a pair of tubular metal sections arranged for formation of the joint, the views illustrating progressive steps in completing the joint;

Fig. 4 is a section on line 4—4 of Fig. 3 illustrating one method of progressive joint formation in a full circular extent; and Fig. 5 is a view similar to Fig. 2 illustrating a variational embodiment of the invention.

Referring first to Fig. 1, the sections indicated at 10 and 11 may represent the end portions of tubular steel parts to be joined, for example tool joint or well pipe sections. Preparatory to formation of the joint, the sections are maintained in axial alinement with their end faces 12 spaced apart a distance, say in the order of 0.002 inch, such as will cause the later described fused brazing metal to flow outwardly by capillarity between the faces. Spacing of the end sections may be maintained in any suitable manner, as for example by center punching one of the faces 12 at 13 to raise the surface of the metal and permit its flattening to an exact height by an appropriate gauge tool. Preferably the outer surface of the sections are beveled at 14 to form an annular recess for accommodation of the weld.

For simultaneous formation of the braze and weld, a relatively low fusing temperature brazing metal, such as a silver solder which flows at about 1175° F., is placed at a location such that upon fusion, the solder will fill the space between and flow against the inner radial extents of the section end faces 12. For example as illustrated in Fig. 2, I may place inside the sections directly opposite the space 15 a silver solder ring 16, the space being openly accessible to the solder upon its fusion. In forming the joint, a relatively high temperature fusing metal, having for example any of the appropriate welding metal compositions, is applied to the outside of the sections within the recess formed by the beveled faces 14.

The weld 17 may be applied from rod 18, starting at a given location and continuing progressively about the sections as illustrated in Fig. 4. The heat applied to the sections in depositing the welding metal, and the heat of the metal itself, are transmitted through the walls of the sections at a rate and to a degree sufficient to melt the solder ring 16. Thus initial melting of the ring will occur at the location at which the welding metal is first deposited, and progressively continues as the weld is progressively formed about the entire circumference of the joint. As the solder ring fuses, its metal tends to be drawn or to flow toward the source of heat, and to flow radially outward by capillarity within the space 15 against the section faces 12 to completely fill the joint space to the point of reaching the weld metal 17.

It is important to observe that upon cooling, the welding metal will solidify and form a strong, rigid and permanent bond between the sections at the outside before the brazing metal cools to its solidifying temperature. Accordingly, the ultimate shape and dimensional characteristics of the joint will have been assumed and fixed by and at the time of solidification of the weld, so that the braze metal may then solidify and bond to the end faces of the section without possible occurrence of strains that would otherwise preclude the possibility of strong brazed adherence of the sections.

In the foregoing I have referred specifically to a procedure whereby the weld and brazed unions are formed sequentially and in a progression about the circular extent of the joint. The invention also contemplates a variational method whereby the welded union first may be formed to join the sections against deformations which otherwise develop during brazing and cause failure of a brazed union attempted by an ordinary procedure. In accordance with this variational method the weld 17 may be deposited on and about the sections in the condition of Fig. 1, thus retaining the ends against a subsequent expansive or belling deformation as referred to herein above. After deposition of the weld, the solder ring 16 then may be placed inside the sections at their spaced ends, and heat applied to the outside of the sections at the weld and at a temperature sufficiently high to cause heat transmission through the metal to the solder ring at a temperature causing the latter to melt and, as before, to flow by capillarity within the space 15 to the inner boundary of the weld.

Fig. 5 illustrates the placement of the solder, particularly for the purposes of the first described method, within the joint space itself. Here one of the sections 10a is shown to be annularly recessed at 21 for reception of the solder ring 22 in a condition such that the latter may project beyond the face 23 to the extent required for the spacing at 24. As the welding metal is applied within the recess 25, ring 22 melts and fills the space from a location directly within the latter. Means other than the ring may or may not be utilized to initially maintain a spaced relation between the sections. If desired an additional solder ring 26 may be placed at the inside of the joint space, as and for the purposes of the previously described ring 16.

I claim:

1. The method of joining a pair of tubular metal sections having opposed end faces sufficiently thick to be butt-joined, that includes welding the sections together at the outside of said faces by heating the sections locally near said end faces and applying relatively high fusing temperature metal, simultaneously brazing said faces together by melting relatively low fusing temperature metal by the heat of welding against said faces, said heat of welding heating the sections to a temperature tending to cause outward divergence of said faces, and holding the faces against such divergence by the weld.

2. The method of joining a pair of tubular metal sections having opposed end faces sufficiently thick to be butt-joined, that includes maintaining said faces in closely spaced relation, placing relatively low fusing temperature brazing metal at the inside of said faces, welding the sections together at the outside of said faces by heating locally near said end faces and applying relatively high fusing temperature metal, and simultaneously bonding said faces together by melting said brading metal by the heat of welding while the temperature of the welding heat is so high as to tend to cause outward divergence at said faces, thereby causing the melted brazing metal to be drawn by capillarity toward the weld while holding the faces against such divergence by the weld.

3. The method of joining a pair of tubular metal sections having opposed end faces sufficiently thick to be butt-joined, that includes placing relatively low fusing temperature brazing metal inwardly of the exterior of said faces, progressively applying relatively high fusing temperature welding material about the joint at the outside of said faces to progressively weld the sections together while locally heating the sections near said faces, melting said brazing metal by the heat of welding against said faces progressively with said welding together of the sections and while the sections are heated by the heat of welding to a temperature tending to cause outward divergence of said faces, but holding the faces against such divergence by the weld.

4. The method of joining a pair of tubular metal sections having opposed closely spaced end faces sufficiently thick to be butt-joined, that includes placing a ring of relatively low fusing temperature metal at the inside of said faces, progressively applying relatively high fusing temperature welding material about the joint at the outside of said faces to progressively weld the sections together while locally heating the sections near said faces, and melting said brazing metal by the heat of welding progressively with said welding together of the sections and causing the melted brazing metal to be drawn by capillarity outwardly between said faces toward the locus of heating, said sections being heated by said heat of welding and during melting of the brazing metal to a temperature tending to cause outward divergence of said faces, but the faces being held against such divergence by the weld.

ALBERT L. STONE.

References Cited in the file of this patent

UNITED STATES PATENTS

| Number | Name | Date |
|---|---|---|
| 1,916,989 | Rader | July 4, 1933 |
| 2,228,087 | Rose | Oct. 18, 1938 |
| 2,280,337 | McKee | Apr. 21, 1942 |
| 2,287,227 | Bowsher | June 23, 1942 |
| 2,424,522 | Wasserman | Mar. 8, 1944 |
| 2,427,747 | Schneider | Sept. 23, 1947 |
| 2,483,934 | Richardson | Oct. 4, 1949 |